2,833,740
PROCESSING OF POLYURETHANE POLYMERS PREPARED FROM POLYALKYLENEETHER GLYCOLS AND PRODUCT RESULTING THEREFROM

John Joseph Verbanc, Wilmington, Del., assignor to E. I. du Pont de Nemours and Company, Wilmington, Del., a corporation of Delaware No Drawing. Application September 7, 1955
Serial No. 533,019

8 Claims. (Cl. 260—45.5)

This invention relates to the preparation of polyurethane elastomers and more particularly to a process of compounding and curing these elastomers.

Curable elastomers having valuable properties may be prepared by reacting long-chain polyalkyleneether glycols with a molar excess of an organic diisocyanate to form a linear polymer containing urethane linkages, and then reacting this polymer with a chain-extending agent containing a plurality of active hydrogen atoms, such as water, a diamine, a hydroxyamine, and the like, as disclosed and claimed in copending application Serial No. 365,270 of Hill, filed June 30, 1953. In a similar manner, polyether-thioether glycols and polyalkylene-aryleneether glycols may be used in place of the long-chain polyalkyleneether glycols. Similar products are obtained by reacting together a high molecular weight organic bischloroformate, an organic diamine and phosgene, as described in copending application Serial No. 461,657 of Carter and Ernsberger, filed October 11, 1954.

Products of this type may be cured by heating, ordinarily under pressure, if the reaction product contains free isocyanate groups. Under these conditions, the free isocyanate groups are believed to react with active hydrogen atoms in the polymer to produce cross-linking of the polymer chains. If the proportion of reactants has been such that few free isocyanate groups are present, or if the uncured reaction product has been stabilized against premature curing by the addition of some material such as a primary or secondary amine which reacts with and ties up the free isocyanate groups, it is necessary to add a curing agent prior to heating to effect vulcanization. The curing agents ordinarily employed are diisocyanates.

Many formulations of elastomers prepared by reacting polytetramethyleneether glycols with organic diisocyanates and then chain-extending with compounds containing two active hydrogen atoms are often difficult to process on ordinary rubber machinery since the polyurethane elastomer frequently has so much nerve that it is difficult to mill or extrude, while other formulations may have sufficient tack to cause them to stick to the surfaces of the machinery. This nerve or track is definitely undesirable; however, it often arises from deliberate variations of the details of the preparation of the elastomer in order to obtain certain desired characteristics in the elastomer.

Many types of plasticizers have been used with various elastomers to reduce their viscosities and thus improve their processability. However, the value of one material as a plasticizer for any given elastomer is no criterion of its value in any other elastomer. The questions of compatibility, solubility, reduction of viscosity and behavior on curing, are not predictable. Most of the generally accepted plasticizers are of no value for use with polyurethane rubber.

It is an object of the present invention to provide a method for processing polyurethane elastomers. A further object is to provide a method for improving the mill processing characteristics of polyalkyleneether glycol/organic diisocyanate/chain-extended elastomers. A still further object is to provide a plasticized polyurethane elastomer. Other objects will appear hereinafter.

It has now been found that according to the present invention a stable, uncured polyurethane elastomer which is curable by heating with a polyisocyanate and which contains substantially no free isocyanate groups may be compounded, prior to the addition of the curing agent, with a polyketone formed by the copolymerization of ethylene and carbon monoxide. The resulting compounded stock can be readily handled on rubber mills and extruders without undesirable sticking to the surface of the rolls or the barrel and worm of the extruder while, at the same time, the viscosity of the composition is lowered to aid processing. In general, from 1 to 10% by weight of the ethylene/carbon monoxide copolymer is sufficient to obtain the beneficial plasticizing results.

The ethylene/carbon monoxide copolymers, or polyketones, which are useful in the present invention should have a molecular weight in the range of about 700 to 1500 in order to insure the compatibility of the polyketone with the elastomer and to facilitate compounding the ingredients on the mill. These polyketones are waxy solids. In general, it is desirable that the ratio of ethylene to carbon monoxide in the polyketone be in the range of between about 5:1 and 12:1 in order to obtain the desirable results of the present invention. When the ratio of ethylene to carbon monoxide is lower than about 5:1, the ketone becomes the dominating factor and the valuable results of the present invention are no longer obtainable; while, on the other hand, when the ratio is greater than about 12:1, the hydrocarbon characteristics begin to dominate and, in general, hydrocarbons are not suitable plasticizing agents for polyurethane elastomers. These ethylene/carbon monoxide copolymers are more particularly described in Brubaker, U. S. P. 2,495,286.

The ethylene/carbon monoxide copolymers which are useful as plasticizers in the present invention may be prepared by heating ethylene/carbon monoxide mixtures at temperatures from about 100 to 250° C. and under pressures of from about 100 to 5,000 lbs. per square inch in the presence of a polymerization catalyst which is active at these temperatures, such as organic peroxides, azonitriles, etc., the reaction being conducted in the presence of an active solvent, i. e., a telogen such as 1,3-dioxolane, acetone, isopropyl alcohol, etc., which is used in amount of from about 1% by weight, based on the total polymerizable ethylene and carbon monoxide charged, up to any excess since the telogen may serve as a solvent for the polymerization. Different polyketones may be prepared by suitably varying the initial proportion of ethylene to carbon monoxide. The preparation of representative polyketones for plasticizers is more particularly described in the examples.

In carrying out the process of the present invention, the polyurethane elastomer is normally worked on a rubber roll mill until it has sheeted out and then the polyketone is added and thoroughly mixed in. Other compounding ingredients which will be more particularly described later may also be added at this point. It is to be understood that all of the ingredients may be added together. In general, it is customary to mill the polyurethane elastomers on a hot roll at about 100° C. for about 10 minutes to dry out any absorbed water before adding the compounding ingredients.

The amount of ethylene/carbon monoxide copolymer or polyketone which is added to the polyurethane elastomer should range from about 1 to 10 parts per 100 parts of elastomer. Amounts less than about 1 part per 100 parts of elastomer are insufficient to bring about the beneficial plasticizing effects, while amounts in excess of about 10 parts per 100 parts of elastomer do not exhibit any increased effect as to the lowering of the viscosity of the composition in order to aid processing and are, therefore, unnecessarily wasteful.

After the addition of the polyketone plasticizer to the polyurethane elastomer and, if desired, various compounding ingredients, the diisocyanate curing agent is added. After thorough milling, the compounded elastomer is ready for shaping in any desired manner and curing may be effected in the customary way by applying heat and pressure.

The diisocyanate curing agents which are useful in the process of the present invention and which are added subsequent to the addition of the polyketone plasticizer include such compounds as 1,3-bis(3-isocyanato-p-tolyl)-urea, 4,4'-methylene di-o-tolylisocyanate, toluene-2,4-diisocyanate, the dimer of toluene-2,4-diisocyanate, 4-tert-butyl-m-phenylene diisocyanate, 4-methoxy-m-phenylene diisocyanate, 4-propyloxy-m-phenylene diisocyanate, 4-chloro-m-phenylene diisocyanate, 4-bromo-m-phenylene diisocyanate and 4-phenoxy-m-phenylene diisocyanate. These diisocyanate curing agents may be used either singly or in combination. The amount of diisocyanate curing agent which is subsequently added to the plasticized elastomer should range from about 1 to 20 parts per 100 parts of elastomer. To effect curing, the resulting mixture of elastomer, plasticizer and curing agent should be heated to a temperature of between about 90 and 150° C.

The polyurethane elastomers which may be compounded and cured according to the process of the present invention include those which are prepared from polyalkyleneether glycols, diisocyanates and chain-extending agents, as disclosed and claimed in pending application Serial No. 365,270 of Hill, filed June 30, 1953. The term "polyalkyleneether glycol" refers to a polyalkyleneether which contains terminal hydroxy groups. These compounds are derived from the polymerization of cyclic ethers such as alkylene oxides or dioxolane or from the condensation of glycols. They are sometimes known as polyalkylene glycols or polyalkylene oxide glycols. Those useful in preparing the uncured polyurethane reaction product may be represented by the formula $HO(RO)_nH$, in which R stands for an alkylene radical and $n$ is an integer sufficiently large that the molecular weight of the compound is at least 750, i. e., large enough that the polyoxalkylene group $—(RO)_n—$ has a formula weight of at least 732. Not all of the alkylene radicals present need be the same. Glycols containing a mixture of radicals, as in the compound $HO(CH_2OC_2H_4O)_nH$ can be used. These glycols are either viscous liquids or waxy solids. To be of value in preparing elastomers, the molecular weight of the glycol should be at least 750 and may be as high as 10,000. It is preferably between 750 and 3,500. Polytetramethyleneether glycol, also known as polybutyleneether glycol, is the preferred glycol. Polyethyleneether glycol, polypropyleneether glycol and poly-1,2-dimethylethyleneether glycol are representative of other operable compounds.

Any of a wide variety of diisocyanates may be used in the polymerization to prepare the uncured polyurethane elastomers. Aromatic diisocyanates, such as toluene-2,4-diisocyanate, 4,4'-methylene-bis(phenyl isocyanate), 1,5-naphthylene diisocyanate and m-phenylene diisocyanate are preferred. Aliphatic compounds such as hexamethylene diisocyanate and tetramethylene diisocyanate, and the alicyclic compounds such as 1,4-cyclohexylene diisocyanate are also operable. It is to be understood that these diisocyanates may be used either singly or in combination.

The chain-extending agent contains a plurality of active hydrogen atoms, no more than two atoms in the molecule having active hydrogen attached thereto. It is preferably water. By "active hydrogen atoms" is meant those hydrogen atoms which display activity according to the well-known Zerewitinoff test as described by Kohler in J. Am. Chem. Soc., 49, 3181 (1927). Other compounds which are suitable as chain-extending agents include glycols, diamines, dicarboxy acids, dicarboxy amides, disulfonic acids and disulfonamides. Representative compounds include ethylene diamine, m-tolylene diamine, benzidine, ethylene glycol, 1,4-butanediol, diethylene glycol, hydrazine, succinic acid and 1,4-butanedisulfonic acid.

In the preparation of the uncured elastomer, an excess of the diisocyanate over the polyalkyleneether glycol is used, which may be only a slight excess or may be up to 12:1 molar ratio. The glycol and the diisocyanate are ordinarily reacted by heating with agitation at a temperature of between 70 and 120° C. Water is then added as the chain-extending agent, usually at about 70 to 80° C., and mixing is continued. During this period the molecular weight of the reaction product increases and the mass gradually forms rubbery chunks. It is then removed from the mixer and sheeted out on a rubber mill. If the reaction product is to be stored prior to the addition of the diisocyanate, processing additive and curing agent, it is then necessary to stabilize it by adding some material such as primary or secondary nitrogen base in amount sufficient to react with the remaining free isocyanate groups. This stabilized polymer and the self-stabilized polymer which results when enough glycol and chain-extending agent have been used to react with all the isocyanate groups may be stored for considerable periods without losing their ability to form a smooth band when milled on a rubber mill.

Variations in the preparation of these polyurethane elastomers from the polyalkyleneether glycols, organic diisocyanates and chain-extending agents may be made in order to produce polyurethane elastomers having an ordered relationship between the various structural units.

It is to be understood that other valuable polyurethane elastomers may be prepared by using polyetherthioether glycols and polyalkylene-aryleneether glycols in place of the polyalkyleneether glycols. These elastomers may also be compounded and cured according to the process of the present invention.

The following examples will better illustrate the nature of the invention. However, the invention is not intended to be limited to these examples. Parts are by weight unless otherwise indicated.

EXAMPLE I

A. Preparation of polyketones

The ethylene/carbon monixide polymers are prepared by the general procedure of Brubaker, U. S. P. 2,495,286. Into a pressure vessel is placed cyclohexane as a solvent and a catalytic amount of di-tert-butyl-peroxide is added. The temperature is adjusted to about 135–150° C. and a gaseous mixture of ethylene and carbon monoxide is introduced into the vessel. The pressure is maintained at about 900–1200 lbs. per square inch by occasionally introducing more of the ethylene/carbon monoxide mixture as the pressure drops. After about 18 hours, the vessel is cooled, the pressure vented, the product removed, filtered and the solvent distilled off. There is obtained a waxy solid ethylene/carbon monoxide polymer. By suitably varying the initial proportion of ethylene to carbon monoxide there are obtained the following polyketones:

| Polyketone No. | Molar Ratio, Ethylene/ Carbon Monoxide | Molecular Weight |
| --- | --- | --- |
| 1 | 5.6/1.0 | 700 |
| 2 | 6.7/1.0 | 1,230 |
| 3 | 12.2/1.0 | 832 |
| 4 | 10.5/1.0 | 1,500 |

B. *Preparation of polyurethane elastomer*

(1) 200 parts of polytetramethyleneether gylcol of molecular weight 1007 is placed into a Werner-Pfleiderer mixer with 23.3 parts of toluene-2,4-diisocyanate and mixed for 3 hours at 100° C. to form a polyurethane glycol. The mass is cooled to 70–75° C. and 0.38 part of water is added and mixing is continued for 15 minutes. Then 26.5 parts of toluene-2,4-diisocyanate is added and mixing at 70–75° C. is continued for 2 hours. There is then added 8.35 parts of water. Mixing is continued for 21 minutes while the temperature rises from 75° to 98° C. The rubbery mass is removed to a rubber roll mill and sheeted out while 1.5 parts of piperidine is added to stabilize the polymer.

(2) 1200 parts of polytetramethyleneether glycol of average molecular weight 947 and 150 parts of toluene-2,4-diisocyanate are heated together for 3 hours at 100° C. to form a polyurethane glycol. 1309 parts of this polyurethane glycol is transferred to a Werner-Pfleiderer mixer equipped with dispersion blades and 0.38 part of water is stirred in at 70° C. under an atmosphere of nitrogen for 15 minutes. Then 107 parts of toluene-2,4-diisocyanate is added and stirring is continued at 70° C. under nitrogen for 3 hours. Then 13 parts of toluene-2,4-diisocyanate is added and stirring continued 15 minutes to mix thoroughly. 50 parts of water is added. An atmosphere of nitrogen is maintained in the mixer and the temperature is held at 60° C. The mixing is carried out continuously for 15 minutes. Then the mixer is run intermittently for 10 seconds every 2 minutes over a period of 30 minutes and then 10 seconds every 5 minutes for a period of 45 minutes. It is then allowed to stand in the mixer for 30 minutes, removed, put on a rubber roll mill and stabilized by milling in 1 part of piperidine.

(3) A mixture of 1200 parts of polytetramethyleneether glycol of average molecular weight 947 and 150 parts of toluene-2,4-diisocyanate is heated for 3 hours at 100° C. to form a polyurethane glycol. 1309 parts of this polyurethane glycol is transferred to a Werner-Pfleiderer mixer equipped with dispersion blades and 0.38 part of water is stirred in during 15 minutes at 70° C. under an atmosphere of nitrogen. Then 116.3 parts of toluene-2,4-diisocyanate is added and the mass is stirred for 3 hours at 70° C. 50 parts of water is added and mixing is carried on for 15 minutes, the temperature being held at 70° C. An atmosphere of nitrogen is maintained in the mixer. Then the mixer is run intermittently for 10 seconds every 2 minutes over a period of 30 minutes and then 10 seconds every 5 minutes for a period of 45 minutes. It is then allowed to stand for 30 minutes. The rubbery polymer is removed from the mixer, transferred to a rubber roll mill and 1 part of piperidine is milled in to stabilize it.

(4) 970 parts of polytetramethyleneether glycol of molecular weight 970 and 118 parts of toluene-2,4-diisocyanate are stirred together for 3 hours at 100° C. The resulting polyurethane glycol has an average molecular weight of 3310 as determined by hydroxyl number. 200 parts of this polyurethane glycol is put in a Werner-Pfleiderer mixer and mixed with 0.35 part of water for 15 minutes at 70–75° C. Then 24.2 parts of toluene-2,4-diisocyanate is added and mixing is continued for 2 hours at 70–75° C. There is then added 7.62 parts of water and mixing is continued for 21 minutes while the temperature rises to 96° C. The rubbery mass is removed from the mixer and sheeted out on a roll mill while 1 part of piperidine is added to stabilize the polymer.

EXAMPLE II 100-part portions of the polyurethane elastomer (Example I–B–1) and 2.5, 5.0 and 7.5-part portions of various polyketones are milled on a rubber mill and then the Mooney viscosity of each stock is determined at 100° C. using the small rotor method D–927–53T in "A. S. T. M. Standards on Rubber Products." The readings are all taken after 10 minutes, which is the low reading.

The reduction in viscosity of the polyurethane elastomer by the addition of the polyketone is summarized in the table below:

| Polyketone No. | Parts Polyketone per 100 Parts Elastomer | Mooney Viscosity, MS-10, 100° C. |
|---|---|---|
|  | 0 | 53 (Control). |
|  | 2.5 | 42. |
| 1 | 5.0 | 39. |
|  | 7.5 | 34. |
|  | 2.5 | 50. |
| 2 | 5.0 | 45. |
|  | 7.5 | 36. |
|  | 2.5 | 50. |
| 3 | 5.0 | 46. |
|  | 7.5 | 42. |

In all cases, the compounded stock was smooth and homogeneous.

EXAMPLE III

Portions of the polyurethane elastomer (Example I–B–1) are compounded on a rubber mill at 100° C. for 10 minutes. The elastomer is put on the mill and banded out and then all the other ingredients are added together. The formulation is as follows:

Parts by weight
Elastomer (Example I–B–1)[1] _____ 100
High abrasion furnace black _____ 15
4-methoxy-m-phenylenediisocyanate _____ 1
1,3-bis(3-isocyanato-p-tolyl)urea _____ 3
Polyketone _____ (2.5, 5.0, 7.5)

[1] In the test with polyketone No. 4, the elastomer of Example I–B–4 is used.

The improvement in processing safety is measured by the Mooney scorch test ("A. S. T. M. Standards on Rubber Products," D–1077–49T) using the small rotor at 250° F. This test measures the change in viscosity of the curable mixture resulting from heating at a specific temperature as a function of time.

Generally speaking, a Mooney scorch test viscosity reading of 60–65 is considered about the maximum viscosity that can be satisfactorily handled on a rubber mill. Consequently, the longer time that a compounded stock can be milled below that viscosity, the greater the factor of safety in processing. Hence, the time interval between the start of the test and a reading of 60–65 is a measure of the improvement effected by the polyketone plasticizers in processing safety.

| Polyketone No. | Parts Polyketone per 100 Parts Elastomer | Minutes to Mooney Viscosity, MS-60, 250° F. |
|---|---|---|
|  | none | 0 (control—MS initially 61). |
|  | 2.5 | 23. |
| 1 | 5.0 | 29. |
|  | 7.5 | >30. |
|  | 2.5 | 19. |
| 2 | 5.0 | 35. |
|  | 7.5 | >36. |
|  | 2.5 | 25. |
| 3 | 5.0 | 35. |
|  | 7.5 | >37. |
| 4 | 10 | >27. |

Separate samples of each composition were cured in molds under pressure for 30 minutes at 134° C. After standing 14 days, the stress-strain properties were determined. The samples were all very similar. The values obtained using polyketone No. 1 are typical.

| Parts Polyketone No. 1 per 100 Parts Elastomer | Tensile Strength At Break, Lbs./Sq. In. | Modulus at 300% Elongation, Lbs./Sq. In. | Elongation At Break, Percent |
| --- | --- | --- | --- |
| 0 | >5,100 | 1,600 | >480 |
| 2.5 | 4,950 | 1,700 | 500 |
| 5.0 | >5,100 | 1,625 | >510 |
| 7.5 | 4,625 | 1,550 | 510 |

EXAMPLE IV

Elastomer (Example I–B–2) was used in this example. When this elastomer is milled on a rubber mill it double rolls, that is, part of the elastomer sticks to both rolls. For satisfactory processing of rubber, it is, of course, essential that the rubber stick only to one roll. When high abrasion furnace black or easy processing channel black is added to the elastomer, the double rolling is aggravated. However, the addition of 4 parts of polyketone No. 4, causes the elastomer to mill properly and not stick to the other roll. The elastomer compounded with carbon black also mills properly when 4 parts of polyketone No. 4 is added.

EXAMPLE V

The following composition based on elastomer (Example I–B–3) is compounded on a rubber mill and sheeted off the mill:

| | Parts by weight |
| --- | --- |
| Elastomer (Example I–B–3) | 100 |
| Polyketone No. 4 | 4 |
| 4-methoxy-m-phenylenediisocyanate | 1 |
| 1,3-bis(3-isocyanato-p-tolyl)urea | 2 |
| Carbon black | 15 |

It is then tested for extrudability in a Royle No. 4 extruder. This machine has a 6-inch worm. The worm, barrel and head are heated to 94–95° C. before the test and then the extrusion is started. The heat is maintained on the head but cooling water turned on the worm and the barrel. The elastomer extrudes in a smooth, even ribbon.

When the test is repeated on the elastomer without the addition of polyketone No. 4, the extruded material is non-uniform in thickness, that is, it is wavy and unsatisfactory for use as tire tread stock. Further, the mixture sticks to the extruder and makes a very difficult clean-up job.

It is quite apparent from the preceding description that the polyketone plasticizers of the present invention are highly compatible with the polyurethane elastomers and greatly improve their processibility.

As pointed out above, the basic elastomeric properties of these elastomers may be varied by suitable compounding. The type and amount of the compounding agent to be used is dependent upon the use for which the elastomer is intended. Some of the more important compounding agents which are of value with these elastomers are carbon black, clay, silica, esterified silica particles (estersils), talc, zinc, calcium and magnesium oxides, titanium dioxide and plasticizers. Inorganic and organic coloring agents may be incorporated to give well-defined colored products. The natural color of the elastomer is a pale yellow or a light amber.

The cured elastomers prepared according to the present process may be used for the same purposes as other elastomers. From them may be prepared such articles as tires, inner tubes, belts, hose and tubes, wire and cable jackets, footwear, sponge, coated fabric and various other molded or dipped articles.

The use of the polyketones of the present invention with the polyurethane elastomers is very advantageous in that they very effectively lower the viscosity of polymer during processing. It is generally considered that a polymer having a Mooney viscosity of greater than 60–65 cannot be satisfactorily processed. But, at the same time, such polymers are frequently desirable in order to provide a cured elastomer of specifically desired properties. When to about 100 parts of such a polymer there is added 1 to 10 parts of the polyketone, the viscosity is reduced to about 35–40 Mooney viscosity. In this range, the polymer is readily millable and various compounding ingredients can be easily incorporated on the mill. Furthermore, the lower viscosity simplifies the molding problem on curing since the polymer very readily fills the mold under pressure.

In many instances, it is desirable to extrude the compounded polymer to facilitate placing in molds for curing. The use of the polyketones makes possible the extrusion of polymers which could not be satisfactorily extruded otherwise.

Another advantage accruing to the use of the polyketones is that it reduces the undesirable mill tack of these polymers which tend to stick to the processing machinery. Some of the polymers tend to double roll on a rubber mill, that is, the polymer sticks to both rolls of the mill instead of only to one roll as is usual. In this case, of course, it is difficult or nearly impossible to satisfactorily compound the polymer with added ingredients or to take it off the mill in a suitable form for further processing. Such behavior is also very bad when an attempt is made to extrude the polymer since it sticks to the worm and barrel of the extruder and also to the head. If extrusion is possible under these circumstances, the extruded strip is irregular and ragged and not suitable for placing in molds and curing.

It is quite apparent that the net effect of the use of these ethylene/carbon monoxide copolymers is to make it possible to process, on ordinary rubber-processing equipment, polyurethane rubbers which are otherwise not processible.

As many widely different embodiments of this invention may be made without departing from the spirit and scope thereof, it is to be understood that this invention is not limited to the specific embodiments thereof except as defined in the appended claims.

I claim:

1. In the processing of a stable, uncured polyurethane polymer which contains substantially no free isocyanate groups, said polymer having been prepared by the reaction of polyalkyleneether glycols of molecular weight from about 750 to 10,000, organic diisocyanates and a chain-extending agent selected from the group consisting of water, hydrazine, organic glycols, organic diamines, organic dicarboxy acids, organic dicarboxy amides, organic disulfonic acids and organic disulfonamides, by incorporating therewith a diisocyanate curing agent and heating the mixture to a temperature of between about 90 and 150° C. until a cured elastomer is formed, the step which comprises incorporating therewith prior to the addition of the curing agent from 1 to 10% by weight of a copolymer of ethylene and carbon monoxide having a molecular weight in the range of 700 to 1500 and a molar ratio of ethylene to carbon monoxide between about 5:1 and 12:1.

2. The process of claim 1 wherein the polyurethane polymer is prepared by the reaction of a polytetramethyleneether glycol having a molecular weight of from about 750 to 10,000, an organic diisocyanate and water.

3. The process of claim 2 wherein the organic diisocyanate is toluene-2,4-diisocyanate.

4. The process of claim 3 wherein the ratio of ethylene to carbon monoxide in the copolymer is about 5.6:1 and the molecular weight of the copolymer is about 700.

5. The process of claim 3 wherein the ratio of ethylene to carbon monoxide in the copolymer is about 10.5:1 and the molecular weight of the copolymer is about 1500.

6. The plasticized elastomers obtained by the process of claim 1.

7. The process of preparing a cured, stable reaction product of a polytetramethyleneether glycol having a molecular weight from about 750 to 10,000, a molar excess of toluene-2,4-diisocyanate and water, said reaction product containing substantially no free isocyanate groups, which comprises incorporating therewith from 1 to 10% by weight of a copolymer of ethylene and carbon monoxide having a molecular weight in the range of 700 to 1500 and a molar ratio of ethylene to carbon monoxide between about 5:1 and 12:1, and thereafter incorporating therewith from 1 to 20% by weight of a diisocyanate curing agent and heating the mixture at a temperature between about 90 and 150° C. to produce a cured elastomer.

8. The cured elastomers obtained by the process of claim 7.

References Cited in the file of this patent

UNITED STATES PATENTS

| | | |
|---|---|---|
| 2,495,286 | Brubaker | Jan. 24, 1950 |
| 2,541,987 | Cramer | Feb. 20, 1951 |
| 2,713,884 | Schwartz | July 26, 1955 |

FOREIGN PATENTS

| | | |
|---|---|---|
| 620,963 | Great Britain | Apr. 1, 1949 |